United States Patent [19]

Hasegawa

[11] Patent Number: 5,579,879
[45] Date of Patent: Dec. 3, 1996

[54] ONE-WAY CLUTCH

[75] Inventor: Kiyoshi Hasegawa, Osaka, Japan

[73] Assignee: Shimano, Inc., Osaka, Japan

[21] Appl. No.: 401,945

[22] Filed: Mar. 10, 1995

[30] Foreign Application Priority Data

Jul. 12, 1994 [JP] Japan .................................. 6-159918

[51] Int. Cl.$^6$ .................................................. F16D 41/064
[52] U.S. Cl. ............................................ 192/45; 192/109 R
[58] Field of Search ................................. 192/45, 109 R; 188/82.84

[56] References Cited

U.S. PATENT DOCUMENTS

| | | | |
|---|---|---|---|
| 1,947,703 | 2/1934 | Fishburn | 192/45 |
| 2,029,244 | 1/1936 | Linder | 192/45 |
| 2,391,350 | 12/1945 | Schmidt | 192/45 |
| 2,902,125 | 9/1959 | House | 192/45 |
| 4,341,294 | 7/1982 | Kerr | 192/45 |
| 5,099,972 | 3/1992 | Ouchi | 192/45 |

FOREIGN PATENT DOCUMENTS

| | | |
|---|---|---|
| 541498 | 7/1922 | France . |
| 1061396 | 4/1954 | France . |
| 1353870 | 1/1964 | France . |
| 52-36249 | 3/1977 | Japan . |
| 62-4933 | 1/1987 | Japan . |
| 6195 | 12/1913 | United Kingdom . |
| 272619 | 6/1927 | United Kingdom . |
| 422067 | 1/1935 | United Kingdom . |

*Primary Examiner*—Richard M. Lorence
*Attorney, Agent, or Firm*—James A. Deland

[57] ABSTRACT

A one-way clutch which is constructed such that there are formed between an external rotary member and an internal rotary member a plurality of clutch member spaces which are defined by cam surfaces of the external rotary member and a cam surface of the internal rotary member and which are arranged in the circumferential direction of the two rotary members. Each of the plurality of clutch member spaces is equipped with clutch rolling members to be switched between a transmission ON state, in which the clutch rolling members bite into the two cam surfaces to couple the two rotary members in an integrally rotatable manner, and a transmission OFF state in which the aforementioned bites are released to allow relative rotation of the two rotary members.

26 Claims, 4 Drawing Sheets

ONE-WAY CLUTCH

BACKGROUND OF THE INVENTION

The present invention is directed to mechanical devices and, more specifically, to a one-way clutch.

A prior art one-way clutch is constructed as shown in FIG. 6. As shown in FIG. 6, each of a plurality of clutch member spaces 5 between an external rotary member 1 and an internal rotary member 2 is equipped with only one roller 4 as a clutch rolling member. A retainer 7 and a spring 8 are disposed between each pair of rollers 4 so that each spring 8 may push its corresponding roller 4 into the narrower side of the clutch member space 5 while using the retainer 7 as a reaction member. As a result, when the external rotary member 1 rotates in a direction F, the roller 4 is enabled to quickly bite into a cam surface K1 of the external rotary member 1 and a cam surface K2 of the internal rotary member 2 by the pushing action of the spring 8. Thus, when the rotating force is input to the external rotary member 1, the rotating force is output from the internal rotary member 2 with very little delay.

Since, in the prior art, only one clutch rolling member is disposed in each clutch member space, a relatively large transmission load is applied to each rolling member at the transmission time so that the rolling member becomes liable to wear. As a result of the wear, the rolling members are deformed to make the meshing engagements between the rolling members and the two rotary members unstable, and slippage in the transmission may occur between the external rotary member and the internal rotary member. Furthermore, upon repeated acceleration and deceleration of the input side rotary member, the rolling members are repeatedly carried toward the wider sides of the clutch member spaces in accordance with the overrun of the output side rotary member. As the rollers repeatedly impinging upon the springs the risk of deforming or breaking the springs and the retainers increases.

SUMMARY OF THE INVENTION

The present invention is directed to a one-way clutch which can reliably transmit driving force from the input rotary member to the output rotary member without any output delay, and which also has a long service life.

In one embodiment of the present invention, there are formed between an external rotary member and an internal rotary member a plurality of clutch member spaces which are defined by cam surfaces of the external rotary member and a cam surface of the internal rotary member. The clutch member spaces are arranged in the circumferential direction of the two rotary members. Each of the plurality of clutch member spaces includes a plurality of rolling members disposed in the circumferential direction of the two rotary members, and the gap between the cam surfaces of the external rotary member and the cam surface of the internal rotary member which define each clutch member space changes in the circumferential direction of the two rotary members. More specifically, each clutch member space is wider in the direction of rotation of the external rotary member and internal rotary member. A stopper is formed integrally with the external rotary member in the wider portion of each clutch member space for limiting the travel of the rolling members disposed within that clutch member space.

At least one of the plurality of rolling members individually positioned in the plurality of clutch member spaces is a clutch rolling member to be switched between a transmission ON state, in which it bites into the two cam surfaces to rotate the two rotary members together, and a transmission OFF state, in which the bite is released to allow the two rotary members to rotate relative to each other. When the rolling members are carried toward the wider side of the clutch member spaces, the stoppers act to receive the rolling members directly to set the limit of movement of the rolling members.

The rolling members positioned at the narrow sides of the clutch member spaces are constructed to act as the clutch rolling members to bite into the cam surfaces, and the rolling members positioned at the wider sides of the clutch member spaces are constructed to act as control rolling members for the clutch rolling members. When the input side of the external rotary member and the internal rotary member starts its rotation in response to the driving input, the control rolling members are rotated on their axes by their contacts with the input side rotary member to carry the clutch rolling members to the narrow sides of the clutch member spaces. Thus, as the input side rotary member rotates, the clutch rolling members quickly move to the narrow sides of the clutch member spaces to bite into the cam surfaces, thereby to join the external rotary member and the internal rotary member in the integrally rotatable manner.

The plurality of rolling members in each clutch member space may have equal diameters, or else the plurality of rolling members may have different diameters wherein the rolling member having the larger diameter is positioned at the forward side in the driving direction of the two rotary members. The plurality of rolling members may be constructed having diameters so that there are spaces between the rolling members during operation, or else the plurality of rolling members may be constructed having diameters so that the plurality of rolling members contact each other as they move toward the narrower side of the clutch member space. The latter construction allows the external rotary member to be formed with flat cam surfaces, but if the external rotary member is formed with continuously smooth cam surfaces, then the plurality or rollers may be constructed having diameters so that the plurality of rollers in each clutch member space together bite into the cam surfaces.

If the plurality of rolling members are constructed such that all of the plurality of rolling members bite into the cam surfaces from the start of service to join the external rotary member and the internal rotary member, that is, such that all the rolling members act as the clutch rolling members, then the transmission load, which has been borne by one rolling member in the prior art, is dispersed in each of the clutch member spaces among the plurality of rolling members so that the rolling members wear less than those of the prior art.

If desired, the one-way clutch may be constructed such that all of the rolling members do not bite into the cam surfaces to join the external rotary member the internal rotary member from the start of service. In that case, any one or more of the plurality of rolling members initially acts as the clutch rolling member to bite into the cam surfaces, whereas the remaining rolling members are kept away from biting into the cam surfaces by giving them a size different from that of the clutch rolling members or by obstructing them from moving to the narrower sides of the clutch member spaces and hence preventing them from biting into the cam surfaces. If some of the rolling members are initially prevented from biting into the cam surfaces by giving them a size different from the that of the clutch rolling members, then, when the rolling members acting as the clutch rolling members from the start of service begin to wear, their function may either be replaced or supplemented by the initially inoperative rolling members. For example, when the rolling members which acted as the clutch rolling members from the start of service wear, they will be carried further into the narrower side of the clutch member spaces. Then, the rolling members which were positioned before the wear at the wider sides of the clutch member spaces and which did not act as clutch rolling members move to the narrower sides of the clutch member spaces so that they too bite into the cam surfaces to now act as clutch rolling members. In other words, if a rolling member which acted as a clutch rolling member from the start of service should wear at a relatively early stage due to a relatively heavy transmission load as in the prior art, another new rolling member acts together with the worn rolling member to reliably perform the transmission function. Alternatively, the rolling member which acted as the clutch rolling member from the start of service may have its function replaced by the new clutch rolling member, so that the new clutch rolling member joins the external rotary member and the internal rotary member in the integrally rotatable manner. As a result, the service life of the one-way clutch is greater than that of prior art clutches, even if the individual rolling members have wearing rates identical to those of the prior art.

Whether all of the plurality of rolling members act as the clutch rolling members from the start of service, or whether a rolling members acts as a clutch rolling member only after a lapse of service time, the rolling members can have their moving limits set at the overrunning time while allowing the clutch rolling members to relatively quickly bite into the two rotary members by replacing the springs of the prior art with stoppers which are integrally formed on the external rotary member. More specifically, the stoppers formed integrally with the external rotary member are nonelastic stoppers, so that they have no control force for pushing the rolling members, unlike the springs of the prior art. However, the nonelastic stoppers, in turn, allow the plurality of rolling members to be disposed in each clutch member space so that their individual range of motion is intrinsically small. As a result, even if the moving limit of the rolling members is set at the overrunning time by the nonelastic stoppers, the rolling members quickly bite into the two rotary members at the input time because of their intrinsically small range of motion. Additionally, the rolling members quickly bite into the two rotary members at the force input time because one or more rolling members act as the control rolling members to aid the movement of the remaining rolling members to the narrower sides of the clutch member spaces. This effect may occur even if the clutch rolling member has worn.

The use of the stoppers of the present invention allow for the elimination of the springs and retainers used in prior art clutches, thus providing a long service life without the deformation and breakage which has been frequently caused in the springs or retainers of the prior art. Even if auxiliary springs were to be added to the present invention for pushing the rolling members to move the clutch rolling members toward the biting sides, they may have spring forces far weaker than those of the springs of the prior art, and the stoppers formed integrally on the external rotary member may exert their forces directly upon the rolling members, so that the springs are hardly deformed or broken even though they abut against the rolling members.

DETAILED DESCRIPTION OF THE EMBODIMENTS

Figure 1:
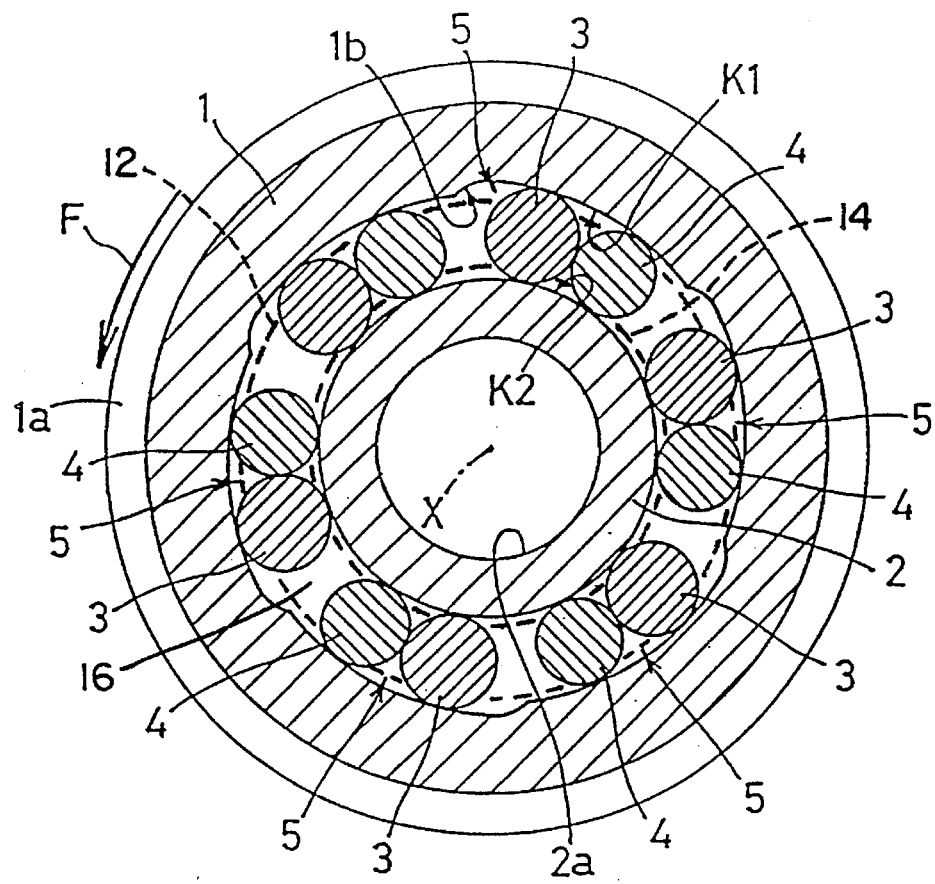
FIG. 1 is a cross-sectional view of a particular embodiment of a one-way clutch according to the present invention.

FIG. 1 is a cross-sectional view of a particular embodiment of a one-way clutch according to the present invention. As shown in FIG. 1, a roller type one-way clutch is constructed by arranging a plurality of rollers 3 and 4 between an external rotary member 1, having a belt pulley portion 1a, and an internal rotary member 2. Internal rotary member 2 is positioned inside of the external rotary member 1 so as to rotate coaxially with and relative to the external rotary member 1. The plurality of rollers 3 and 4 have axes of rotations exactly or generally in parallel with the axis X of rotation of the two rotary members 1 and 2 and are juxtaposed to each other in the circumferential direction of the two rotary members 1 and 2. The external rotary member 1 is associated with a belt so that it may be driven by the (not-shown) motor in the direction of rotation F, and the internal rotary member 2 is joined at its opening 2a to the (not shown) apparatus to be driven. Specifically, the one-way clutch is constructed such that the rotating force in the direction F can be input from the motor to the external rotary member 1 and output as the driving power from the internal rotary member 2 to the apparatus, while enabling the apparatus to overrun by the inertia of rotation when the motor is stopped or decelerated, as will be described in detail below.

Figure 2:
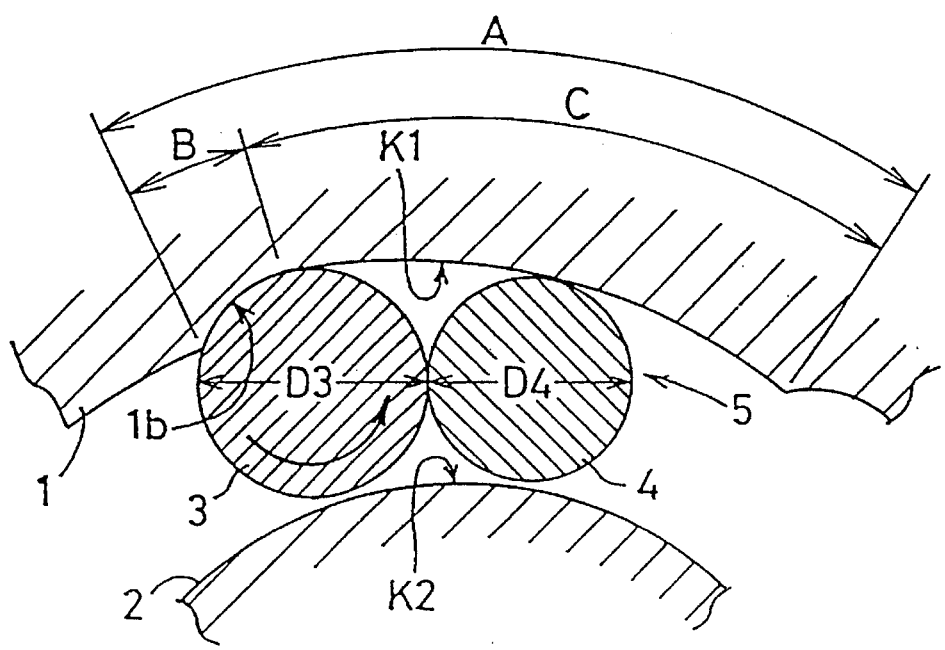
FIG. 2 is a cross-sectional diagram of a particular embodiment of a clutch member space according to the present invention showing a transmission OFF state.

Between the external rotary member 1 and the internal rotary member 2 are formed six clutch member spaces 5 which are arranged in the circumferential direction of the two rotary members 1 and 2. Each clutch member spaces has two of the aforementioned rollers 3 and 4. As shown in FIG. 2, each clutch member space 5 is defined by both one of six cam surfaces K1 formed on the inner circumference of the external rotary member 1 and a cam surface K2 of the internal rotary member 2 facing the cam surface K1. Each of the six cam surfaces K1 of the external rotary member 1 is formed into an arcuate surface so that the cam surface K1 becomes progressively closer to the cam surface K2 in the direction opposite to direction F. Moreover, each cam surface K1 has such a length in the circumferential direction of the external rotary member 1 as extends over an angular range C narrower by an angular range B than an angular range A corresponding to one sixth of the inner circumference of the external rotary member 1. The angular range B spans an arcuate stopper 1b integrally formed with the external rotary member 1. The cam surface K2 of the internal rotary member 2 corresponding to the cam surface K1 of the external rotary member 1 forms part of the outer circumference of a cylinder on the axis X of the external rotary member 1. Thus, each clutch member space 5 is formed into a forward diverging chamber in which the gap between the cam surface K1 of the external rotary member 1 and the cam surface K2 of the internal rotary member 2 grows wider in the direction of rotation of the two rotary members 1 and 2.

Figure 6:
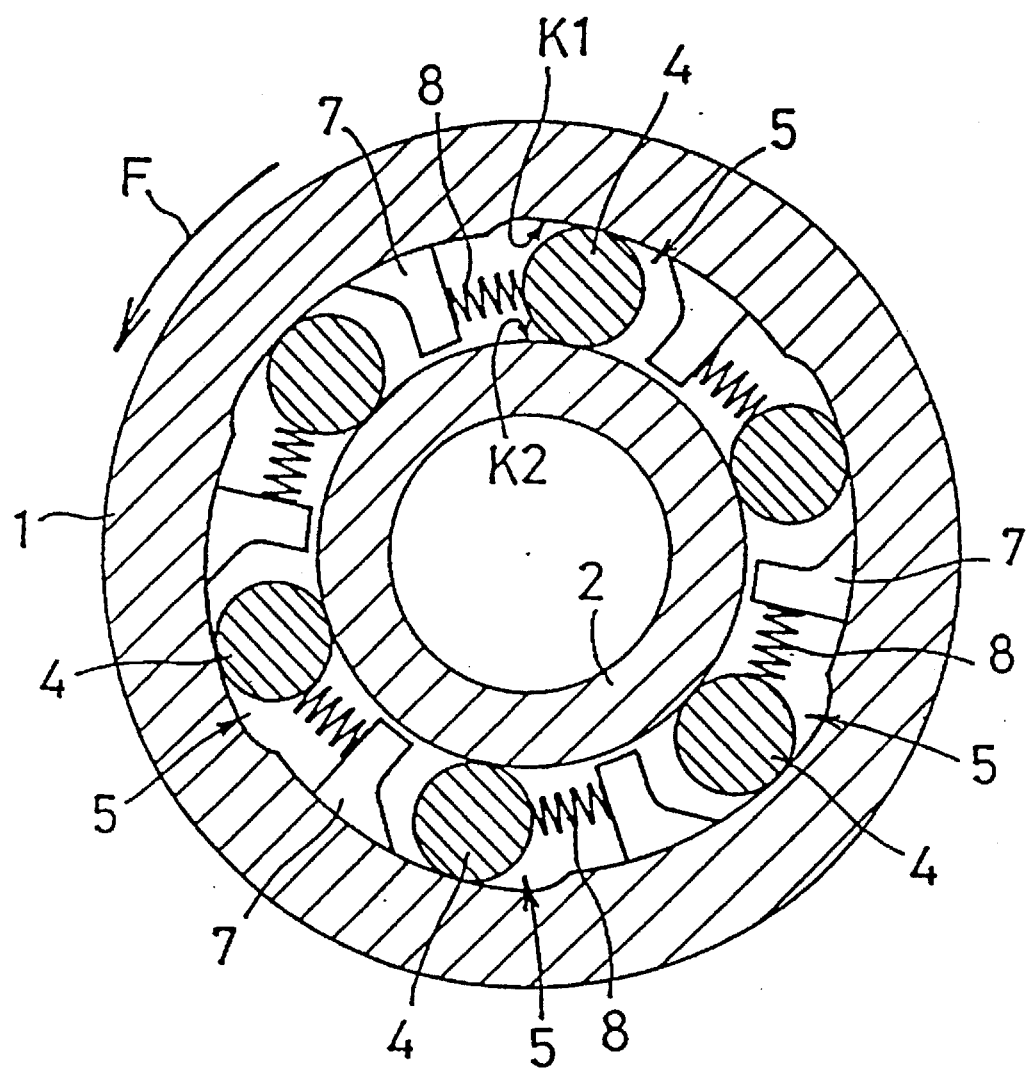
FIG. 6 is a cross-sectional view of a one-way clutch known in the prior art.

If a circle 14 is drawn radially outwardly of internal rotary member 2 and radially inwardly of an equator of rollers 3 and 4, and if a circle 12 is drawn radially inwardly of external rotary member 1 and radially outwardly of the equator of rollers 3 and 4, then an annular space 16 is formed therebetween. Unlike the prior art structure shown in FIG. 6, only the rollers 3 and 4 in each clutch member space 6 are disposed in free space 16.

In each of the six clutch member spaces 5, as shown in FIGS. 1 and 2, the rollers 3 and 4 are made such that the roller 3 is arranged at the forward side of the roller 4 in the direction F of the external rotary member 1 and the internal rotary member 2. In this embodiment, the roller 3 has a diameter D3 larger than the diameter D4 of the roller 4. A transmission is turned ON when the roller 4 is carried toward the narrower side of the clutch member space 5 to take the position shown in FIG. 3. More specifically, the rollers 4 act as clutch rollers and bite, when the transmission is ON, into the cam surfaces K1 of the external rotary member 1 and the cam surface K2 of the internal rotary member 2 to rotate the external rotary member 1 and the internal rotary member 2 together. The transmission is turned OFF when the rollers 4 are carried from the aforementioned ON state toward the wider sides of the clutch member spaces 5 to or near the position shown in FIG. 2, wherein they abut against the rollers 3 received and borne by the aforementioned stoppers 1b of the external rotary member 1. In this OFF state, the bites into the cam surfaces K1 of the external rotary member 1 and the cam surface K2 of the internal rotary member 2 are released to allow the external rotary member 1 and the internal rotary member 2 to rotate relative to each other. In the transmission OFF state, the rollers 3 can have their diameter D3 and their gaps from the cam surfaces K1 and K2 set such that they can be prevented from biting into the cam surfaces K1 and K2 to allow the relative rotations of the external rotary member 1 and the internal rotary member 2.

In this embodiment, the cam surfaces K1 of the external rotary member 1 are formed into a smooth and continuous curved surface. As a result, although the cam surface K2 of the internal rotary member 2 is a curved surface formed by the outer circumference of a cylinder, the transmission can be shifted from the aforementioned OFF state to the aforementioned ON state and vice versa with the rollers 3 and 4 being held in contact. That is, the rollers 3 can turn from the positions in which they abut against the aforementioned stoppers 1b of the external rotary member 1, to the positions in which they abut against the rollers 4 in the aforementioned ON state, while in contact with the rollers 4.

As the motor is accelerated from the state shown in FIG. 2 to rotate the external rotary member 1 in the direction F, the rollers 3 are caused to rotate on their axes in the direction of the arrow in FIG. 2 by their contacts with the external rotary member 1 so that their rotational forces carry the rollers 4 toward the narrower sides of the clutch member spaces 5. Rollers 4 then bite into the cam surfaces K1 and K2 and are in the transmission ON state. As a result, the internal rotary member 2 outputs the rotating force from the external rotary member 1 to the apparatus to be driven. If, while in this state, the motor is stopped or decelerated to stop or decelerate the external rotary member 1 so that the rotational inertia of the apparatus acts upon the internal rotary member 2, then the rollers 3 and 4 are carried between the two rotary members 1 and 2 toward the wider sides of the clutch member spaces 5 by their contacts with the internal rotary member 2 so that the rollers 4 are switched from the ON state to the OFF state to release the coupling between the internal rotary member 2 and the external rotary member 1. As a result, the internal rotary member 2 is enabled to rotate in the direction F relative to the external rotary member 1 by the rotational inertia of the apparatus to be driven. Then, the rollers 3 come into direct abutment against the stoppers 1b, and the rollers 4 come into abutment against the rollers 3 so that the stoppers 1b act to receive the rollers 3 and 4 by directly contacting roller 3 which, in turn, contacts roller 4. In this position, rollers 3 and 4 are at the limit of their movement in this direction and are in a standby position for moving to the narrower sides of the clutch member spaces 5 when the external rotary member 1 is subsequently accelerated.

Figure 3:
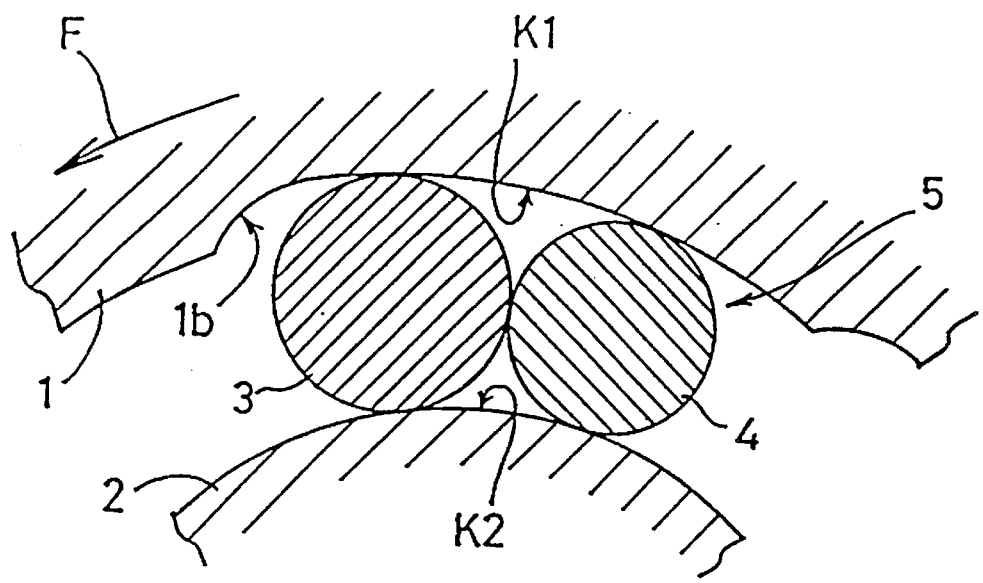
FIG. 3 is a cross-sectional diagram of a particular embodiment of a clutch member space according to the present invention showing a transmission ON state.

At the transmission time, as shown in FIG. 3, the rollers 3 are positioned to abut against the rollers 4 in the aforementioned ON state. If desired, the rollers 3 may be prevented from biting into the cam surfaces K1 and K2 and accordingly from coupling the two rotary members 1 and 2 at the transmission time by setting their diameter D3 so that the rollers 3 have a gap from the cam surfaces K1 and K2. Alternatively, the rollers 3 may be sized to bite like the rollers 4 into the cam surfaces K1 and K2 at the transmission time to couple the two rotary members 1 and 2. With this construction, the load at the transmission time is shared between the rollers 3 and 4 so that the wear of the rollers 4 resulting from their transmitting actions is made less than that of the time when only the rollers 4 participate in the coupling action.

In addition to the structure in which the rollers 4 are forced into the transmission ON state exclusively by the rollers 3, there may also be provided auxiliary springs for urging the rollers 3 toward the narrower sides of the clutch member spaces 5 to bring the rollers 4 into the transmission ON state. Since, in this modification, the urging forces of the auxiliary springs may be far weaker than those of the prior art, and since the rollers 3 can be brought at the overrunning time into abutment against the stoppers 1b to prevent the springs from being deformed to their limits, the springs are less frequently deformed and broken than those of the prior art.

Figure 4:
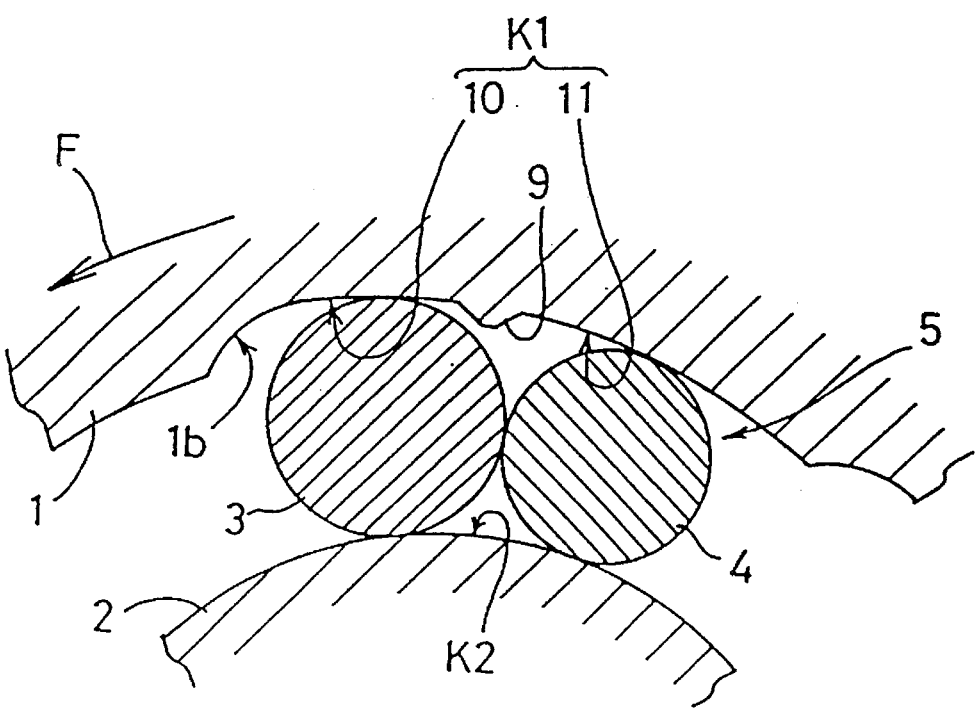
FIG. 4 is a cross-sectional view of an alternative embodiment of a clutch member space according to the present invention.

FIG. 4 is a cross-sectional view of an alternative embodiment of a clutch member space according to the present invention. In this embodiment, the cam surfaces K1 of external rotary member 1 each include a ridge 9. The ridges 9 act as reinforcing ribs and are arranged to allow the rolling members 4 to switch between the aforementioned clutch OFF state and the aforementioned clutch ON state without preventing the rolling members 3 from coming into contact with the rolling members 4. Each cam surface K1 comprises a cam surface portion 10, which is positioned at the wider side of the clutch member space 5 next to the ridge 9, and a cam surface portion 11 which is positioned at the narrower side of the clutch member space 5 next to the ridge 9. These cam surface portions 10 and 11 are positioned on a virtual arcuate surface on an axis different from the axis X of rotation of the external rotary member 1, and they have the same general shape as the cam surfaces K1 of the one-way clutch of FIGS. 1 to 3. That is, the cam surfaces K1 are substantially identical to the cam surfaces K1 of FIGS. 1 to 3 and smoothly extend along the circumference of the rotary member 1. Thus, the ridges 9 do not obstruct the actions of the rolling members 3 and 4, so the cam surfaces K1 formed of the cam surface portions 10 and 11 perform the same actions as those of the cam surfaces K1 of FIGS. 1 to 3 which do not have ridge 9. In general, the cam surfaces need not have a smooth, continuous shape, as long as the cam surfaces can perform the same actions as those of the smooth and continuous cam surfaces.

Figure 5:
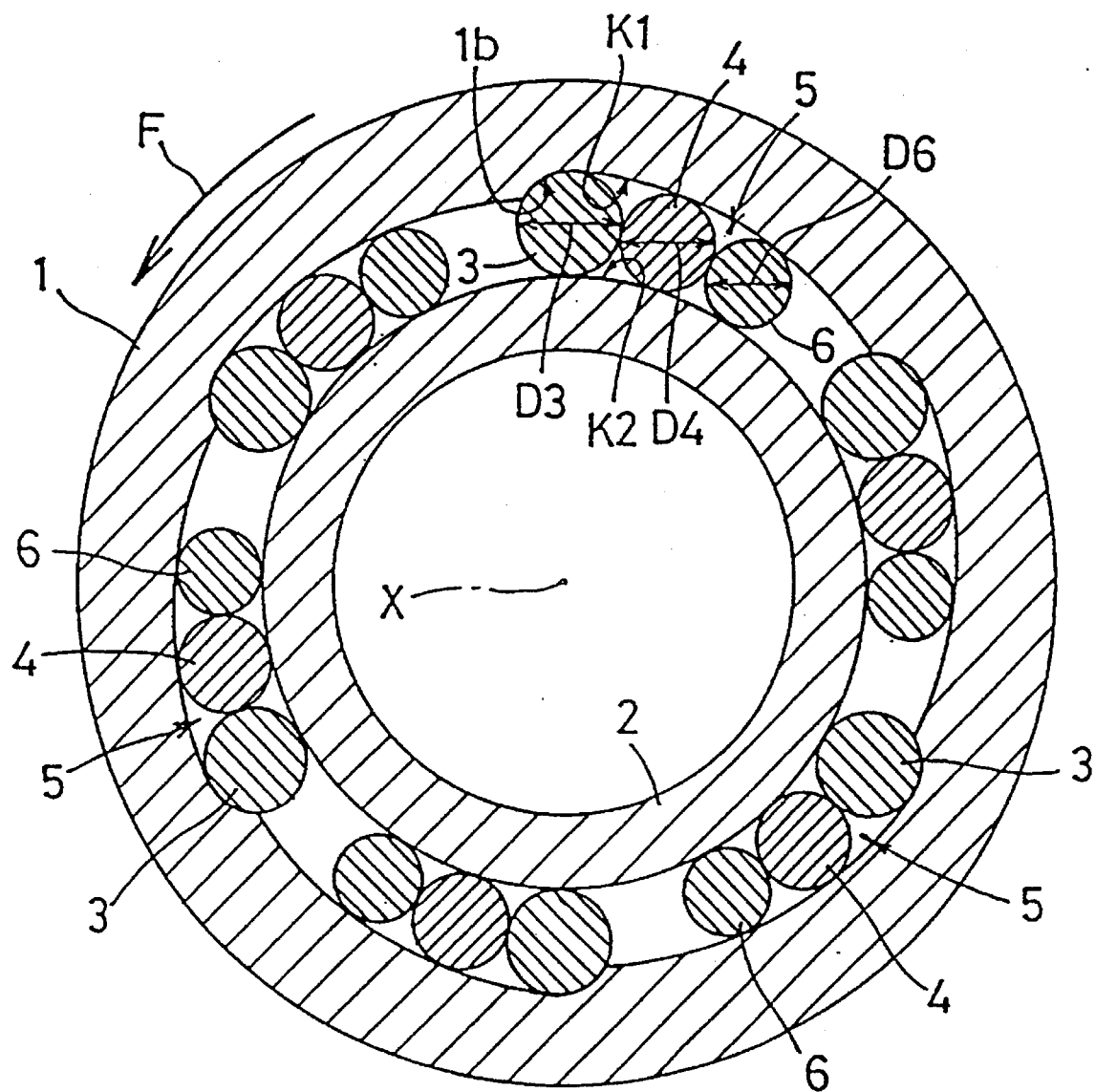
FIG. 5 is a cross sectional view of an alternative embodiment of a one-way clutch according to the present invention.

FIG. 5 is a cross-sectional view of an alternative embodiment of a one-way clutch according to the present invention. In this embodiment, each of a plurality of clutch member spaces 5 between the external rotary member 1 and the internal rotary member 2 is equipped with three rolling members 3, 4 and 6 which are arranged in the circumferential direction of the two rotary members 1 and 2. These three rolling members 3, 4 and 6 are arranged such that the rolling member 3 takes the foremost position in the direction of rotation F of the two rotary members 1 and 2; the rolling member 6 takes the rearmost position; and the rolling member 4 is interposed between the rolling members 3 and 6. The rolling members 3, 4 and 6 are set to have their diameters D3, D4 and D6 as follows:

$D3>D4>D6$.

In this embodiment, all of the three rolling members 3, 4 and 6 constitute clutch rolling members so that when the external rotary member 1 rotates in the direction F the three rolling members 3, 4 and 6 can bite into the cam surfaces K1 of the external rotary member 1 and the cam surface K2 of the internal rotary member 2 to couple the two rotary members 1 and 2 in an integrally rotatable manner.

If less than all the rolling members 3, 4, or 6 act as clutch rolling members, whether by design or because of a size difference due to manufacturing errors, then, after the initial clutch rolling members have worn, the remaining rolling members can additionally act as the clutch rolling members to couple the two rotary members 1 and 2. Alternatively, only the rolling members other than the worn rolling member can act as the clutch rolling members to couple the two rotary members 1 and 2, thus replacing the worn rolling members in the transmission function.

If the cam surfaces K1 of the external rotary member 1 are made arcuate and have smooth and continuous curved surfaces, the three rolling members 3, 4 and 6 can contact one another in the same manner as the embodiment shown in FIGS. 1–3. That is, they can be switched between the biting state and the released state with the cam surfaces K1 and K2 while contacting one another. As a result, when the external rotary member 1 rotates, the rolling members positioned in the forward side of the direction of rotation can push the rolling members positioned in the rear side to the narrower side of the clutch member spaces to quickly bite into the cam surfaces.

If desired, rollers 3, 4 and 6 could take the form of roller bearings which extend in the direction along the axis X of rotation of the external rotary member 1 and the internal rotary member 2. If so constructed, then rollers 3, 4, and 6 linearly contact the two rotary members 1 and 2 so that they can bear as much of a transmission load as possible while avoiding the dents which might otherwise be caused as a result of application of the transmission load to the rollers and the rotary members. Consequently, the torque to be transmitted can be increased as much as possible.

While the above is a complete description of some embodiments of the present invention, various modifications may be employed. For example, the present invention can be applied not only to the construction where the external rotary member is disposed at the input side and the internal rotary member is disposed at the output side, as in the foregoing embodiments, but also to a one-way clutch wherein the internal rotary member is disposed at the input side and the external rotary member is disposed at the output side. Consequently, the scope of the invention should be ascertained by the following claims.

What is claimed is:

1. A one-way clutch comprising:
   an internal rotary member;
   an external rotary member;
   wherein a surface of the internal rotary member and a surface of the external rotary member define a plurality of clutch member spaces so that a width of each clutch member space varies from a wider portion to a narrower portion;
   a stopper disposed at the wider portion of each clutch member space, the stopper being formed as one piece with at least one of the external rotary member and internal rotary member;
   a first movable member disposed in each clutch member space;
   a second movable member disposed in each clutch member space;
   wherein the stopper in each clutch member space directly receives at least one of the first and second movable members and sets the limit of motion of the at least one of the first and second movable members within the clutch member space;
   wherein a first circle disposed radially outwardly from the internal rotary member and radially inwardly of a midpoint of the first and second movable members in each clutch member space and a second circle disposed radially inwardly of the external rotary member and radially outwardly of the midpoint of the first and second movable members in each clutch member space define an annular free space therebetween, and wherein only the first and second movable members in the plurality of clutch member spaces are disposed within the free space;
   wherein at least a selected one of the first and second movable members in each clutch member space, when in a first position, contacts the surfaces of both the external rotary member and internal rotary member for inhibiting rotation of the external rotary member and internal rotary member relative to each other; and
   wherein the selected one of the first and second movable members in each clutch member space, in a second position, allows relative rotation of the internal rotary member and external rotary member.

2. The one-way clutch according to claim 1 wherein the first movable member in each clutch member space comprises a first rolling member.

3. The one-way clutch according to claim 2 wherein the first rolling member in each clutch member space is adapted to directly contact the stopper in that clutch member space.

4. The one-way clutch according to claim 3 wherein a radius of curvature of a surface of the stopper which contacts the first rolling member in at least one of the plurality of clutch member spaces substantially equals a radius of curvature of the outer surface of the first rolling member.

5. The one-way clutch according to claim 1 wherein both the first and second movable members in each clutch member space securely contacts the surfaces of both the external rotary member and internal rotary member when the at least one of the first and second movable members is in the first position.

6. The one-way clutch according to claim 5 wherein the first and second movable members in each clutch member space contact each other when the at least one of the first and second movable members is in the first position.

7. The one-way clutch according to claim 5 wherein the first and second movable members in each clutch member space are spaced apart from each other when the at least one of the first and second movable members is in the first position.

8. The one-way clutch according to claim 1 wherein only the second movable member in each clutch member space securely contacts the surfaces of both the external rotary member and internal rotary member for inhibiting rotation of the external rotary member and internal rotary member relative to each other.

9. The one-way clutch according to claim 8 wherein the first movable member in each clutch member space contacts the second movable member when the second movable member securely contacts the surfaces of both the external rotary member and internal rotary member.

10. The one-way clutch according to claim 9 wherein the first movable member in each clutch member space comprises a first rolling member.

11. The one-way clutch according to claim 10 wherein the first rolling member in each clutch member space contacts the surface of the outer rotary member and rolls to push the second movable member so that the second movable member securely contacts the surfaces of both the external rotary member and internal rotary member for inhibiting rotation of the external rotary member and internal rotary member relative to each other.

12. The one-way clutch according to claim 11 wherein the second movable member in each clutch member space comprises a second rolling member.

13. The one-way clutch according to claim 1 wherein the first movable member in each clutch member space comprises a first rolling member, and wherein the second movable member in each clutch member space comprises a second rolling member.

14. The one-way clutch according to claim 13 wherein the first rolling member in each clutch member space is disposed in front of the second rolling member in the direction of rotation of the internal rotary member and external rotary member, and wherein the first rolling member has a greater diameter than the second rolling member.

15. The one-way clutch according to claim 14 wherein the first and second rolling members in each clutch member space contact each other while the internal rotary member and external rotary member rotate integrally with each other.

16. The one-way clutch according to claim 15 wherein the surface of the external rotary member is shaped as a plurality of continuous smooth curves so that the first and second rolling members in each clutch member space contact each other when the at least one of the first and second rolling members moves from the first position to the second position.

17. A one-way clutch comprising:
an external rotary member;
an internal rotary member;
wherein cam surfaces of the external rotary member and a cam surface of the internal rotary member define a plurality of clutch member spaces that are disposed between the external rotary member and the internal rotary member in a circumferential direction;
wherein a gap defined by the cam surfaces of the external rotary member and internal rotary member in each clutch member space varies in the circumferential direction from a wider portion to a narrower portion;
wherein a stopper is formed as one piece with the external rotary member at the wider portion of each of the plurality of clutch member spaces;
a plurality of rolling members disposed in each of the plurality of clutch member spaces;
wherein the stopper in each of the plurality of clutch member spaces directly receives the plurality of rolling members and sets the limit of motion of the plurality of rolling members within that clutch member space;
wherein a first circle disposed radially outwardly from the internal rotary member and radially inwardly of an equator of the plurality of rolling members and a second circle disposed radially inwardly of the external rotary member and radially outwardly of the equator of the plurality of rolling members define an annular free space therebetween, and wherein only the plurality of rolling members in each clutch member space are disposed within the free space;
wherein at least one of the plurality of rolling members in each clutch member space when in a transmission ON state securely contacts the cam surfaces of both the external rotary member and internal rotary member so that the internal rotary member and external rotary member rotate integrally with each other; and
wherein the at least one of the plurality of rolling members in each clutch member space when in a transmission OFF state allows the internal rotary member and external rotary member to rotate relative to each other.

18. The one-way clutch according to claim 17 wherein a first rolling member of the plurality of rolling members is disposed in a forward direction of a second rolling member of the plurality of rolling members in the direction of rotation of the internal rotary member and external rotary member, and wherein the first rolling member has a greater diameter than the second rolling member.

19. The one-way clutch according to claim 18 wherein the plurality of rolling members contact each other while the internal rotary member and external rotary member rotate integrally with each other.

20. The one-way clutch according to claim 19 wherein the cam surfaces of the external rotary member are shaped as continuous smooth curves so that the plurality of rolling members in each clutch member space contact each other when the at least one of the plurality of rolling members moves from the transmission ON state to the transmission OFF state.

21. The one-way clutch according to claim 17 wherein a radius of curvature of a surface of the stopper in each clutch member space substantially equals a radius of curvature of a rolling member which contacts it.

22. A one-way clutch comprising:
an internal rotary member;
an external rotary member;
wherein a surface of the internal rotary member and a surface of the external rotary member define a plurality of clutch member spaces so that a width of each clutch member space varies from a wider portion to a narrower portion;
a stopper disposed at the wider portion of each clutch member space, the stopper being formed as one piece with at least one of the external rotary member and internal rotary member;
a first rolling member disposed in each clutch member space;
wherein the stopper in each clutch member space directly receives the first rolling member and sets a limit of motion of the first rolling member within the clutch member space;

wherein a radius of curvature of a surface of the stopper in each clutch member space is not less than a radius of curvature of the first rolling member which contacts it;

wherein the first rolling member in each clutch member space, when in a first position, contacts the surfaces of both the external rotary member and internal rotary member for inhibiting rotation of the external rotary member and internal rotary member relative to each other; and wherein the first rolling member in each clutch member space, in a second position, allows relative rotation of the internal rotary member and external rotary member.

23. The one-way clutch according to claim 22 further comprising a second rolling member disposed in each clutch member space.

24. The one-way clutch according to claim 23 further comprising a third rolling member disposed in each clutch member space.

25. The one-way clutch according to claim 22 wherein the radius of curvature of the surface of the stopper in each clutch member space substantially equals a radius of curvature of the first rolling member which contacts it.

26. The one-way clutch according to claim 22 wherein a first circle disposed radially outwardly from the internal rotary member and radially inwardly of an equator of the rolling member in each clutch member space and a second circle disposed radially inwardly of the external rotary member and radially outwardly of the equator of the rolling member in each clutch member space define an annular free space therebetween, and wherein only the rolling members in the plurality of clutch member spaces are disposed within the free space.

* * * * *